United States Patent Office 3,234,179
Patented Feb. 8, 1966

---

3,234,179
PROCESS FOR MAKING ORGANOPOLY-SILOXANES
Arthur Katchman and Kenneth M. Kiser, Schenectady, N.Y., assignors to General Electric Company, a corporation of New York
No Drawing. Filed Feb. 23, 1962, Ser. No. 175,286
7 Claims. (Cl. 260—46.5)

This invention relates to a process for making organopolysiloxanes. More particularly, the invention is concerned with a process for making soluble organopolysiloxanes containing an average of from about 1.0 to 1.1 silicon-bonded organic groups per silicon atom and for obtaining such organopolysiloxanes by a process which involves controlling the intrinsic viscosity of these organopolysiloxanes which comprises (1) forming a homogeneous mixture comprising (a) an organopolysiloxane prepolymer composed of from 90 to 100 mol percent of organosiloxy unts of the formula $$RSiO_{3/2}$$

any remaining organosiloxy units of the organopolysiloxane being selected from the class consisting of organosiloxy groups of the formula $$R'R''SiO, R'[CN—(CH_2)_m]SiO, R'''SiO_{3/2}$$

and $$CN(CH_2)_mSiO_{3/2}$$

where R is an aryl radical, R' and R'' are selected from the class consisting of aryl radicals, alkyl radicals, alkenyl radicals, and mixtures of such radicals, R''' is a lower alkyl radical, and m is a whole number equal to from 2 to 4, and (b) a solvent for the prepolymer, and (2) heating the mixture of the prepolymer and the solvent in the presence of an alkaline rearrangement and condensation catalyst in accordance with conditions established by the formula I  $\eta = 0.045(M/X)^{1.4}$ where $\eta$ is the desired intrinsic viscosity in deciliters per gram when measured in benzene at 25° C., X is the weight of the solvent in the condensed phase, and M is the weight of the prepolymer, thereby to obtain a benzene-soluble, higher molecular weight organopolysiloxane of improved molecular weight distribution, the amount of solvent initially used being equal to that required to effect the desired solvation of the prepolymer, but being in excess of that required by the above formula to give the desired intrinsic viscosity.

In U.S. Patent 3,017,386 of John F. Brown, Jr. and Lester H. Vogt, issued January 16, 1962, and assigned to the same assignee as the present invention, there are disclosed and claimed methods for making the above-mentioned organopolysiloxanes having intrinsic viscosities of from 0.4 to 5 or even higher from an organopolysiloxane prepolymer composed of from 90 to 100 mol percent of organosiloxy units of the formula $$RSiO_{3/2}$$

any remaining organosiloxy units of the organopolysiloxane being selected from the class consisting of organosiloxy groups of the formula $$R'R''SiO, R'[CN—(CH_2)_m]SiO, R'''SiO_{3/2}$$

and $$CN(CH_2)_mSiO_{3/2}$$

where R, R', R'', R''' and m have the meanings given above. The general process for making these organopolysiloxanes having improved heat resistance comprises heating the polysiloxane prepolymer in the presence of a rearrangement catalyst at elevated temperatures with a solvent which is advantageously a high boiling solvent, e.g., those solvents boiling around 125° C. and higher.

If one follows the disclosures and teachings in this patent, one will obtain higher intrinsic viscosity organopolysiloxanes which are soluble in benzene and which have the desirable property of being infusible at elevated temperatures and having good heat resistance at these temperatures. However, difficulty has been encountered in obtaining a uniform molecular weight distribution as well as a more uniform intrinsic viscosity distributon for these organopolysiloxanes. If the molecular weight distribution and intrinsic viscosity ar spread over too wide a range, it is often necessary to remove the lower molecular weight, lower intrinsic viscosity materials in order to obtain optimum properties in the final product. Thus, when one carries out the process of the above patent, it is found that the reaction product is composed not only of higher intrinsic viscosity materials but there is also present a larger proportion of lower intrinsic viscosity material than is usually desired so that, of the final organopolysiloxane, an undesirably smaller proportion of the product is that within the desired intrinsic viscosity range. In addition, in order to obtain higher intrinsic viscosty materials, it is necessary to use relatively small amounts of solvent thereby thwarting the attainment of a suitably homogeneous solution for carrying out the reaction of the prepolymer and rearrangement catalyst to yield the higher intrinsic viscosity material.

Unexpectedly, we have discovered that we are able to make organopolysiloxanes of the above formulation whereby the final product contains a much larger proportion of a desired intrinsic viscosity material, and what is equally as important, the final product has a molecular weight distribution which is much narrower than has been possible heretofore. In accordance with our invention, we prepare a mixture of the prepolymer organopolysiloxane (which will hereinafter be defined and referred to as "prepolymer") in a sufficiently large amount of a suitable solvent (or mixture of solvents) for the prepolymer, and thereafter having taken advantage of the improved solution of the prepolymer in the solvent because of the larger amount of solvent which has been used to obtain homogeneous products the excess solvent (or solvents) is removed and the final polymerization carried out at elevated temperatures in the presence of an alkaline rearrangement catalyst in such a way that depending on the desired intrinsic viscosity the relationship between the residual solvent in the prepolymer and the amount of the prepolymer is in accordance with the relationship $$\eta = 0.045(M/X)^{1.4}$$

where $\eta$ is the desired intrinsic viscosity in deciliters per gram when measured in benzene at 25° C., X is the weight of the solvent in the condensed phase remaining in contact with the prepolymer during the polymerization reaction and M is the weight of the prepolymer. Surprisingly, it was found that this formula relationship was temperature independent over a wide temperature range.

It is accordingly one of the objects of this invention to prepare benzene-soluble organopolysiloxane polymers having a specified intrinsic viscosity of 0.4 and higher and having a narrow molecular weight distribution.

It is a still further object of the invention to prepare organopolysiloxane polymers of intrinsic viscosity of 0.4 or higher where a larger proportion of the reaction product has a more uniform intrinsic viscosity, particularly in the higher intrinsic viscosity range.

It is another object of the invention to prepare organopolysiloxane polymers of intrinsic viscosity greater than 0.4 using an excess of solvent or solvents, including the solvent in which the polymerization to the higher intrinsic viscosity material is to take place, as a means for making more homogeneous the mixture of the prepolymer and the solvent.

Other objects of the invention will become more apparent from the disclosures which are given below.

The above-described intrinsic viscosity (identified by the symbols "[$\eta$]" or "$\eta$") referred to herein as a measurement of the molecular weight of the polymers prepared in accordance with our invention was determined as follows. The viscometer used was a modified Ubbelohde viscometer in which in place of the straight capillary tube between the second bulb and the reservoir, a coil of two turns of capillary tubing was substituted. The dimensions of the capillaries were (a) 2 mm. diameter between first and second bulbs and (b) 0.5 mm. diameter for coiled capillary (inside diameter of coils about 1"). The intrinsic viscosity was carried out in a constant temperature water bath maintained at about 25° C.

The actual determination of the intrinsic viscosity involved drying of 0.1 gram of the polymer whose intrinsic viscosity was to be determined, in vacuum at 110° C. for three hours and then weighing the sample. A volume (in milliliters) of reagent grade benzene was added equal to the weight of the polymer (in grams) multiplied by 100. When all the polymer had dissolved, a small test tube was filled with the solution, corked and centrifuged to settle out any foreign matter that might be present. A 5 ml. aliquot was removed from the test tube and transferred to the viscometer placed in a 25° C. constant temperature water bath. The bulbs of the viscometer were filled with the solution and the time in seconds for the solution to fall from the first to the second graduation was recorded. Several dilutions were made by adding known volumes of benzene to the reservoir bulb, mixing thoroughly, and then repeating the procedure. The number of seconds required for the solvent to pass through the first and second graduations was checked periodically. The intrinsic viscosity was determined by plotting the specific viscosity divided by the concentration against the concentration in grams of polymer per hundred ml. of benzene and extrapolating the curve to C (concentration) equal to 0. The following are the formulas which were used in determining the intrinsic viscosity.

$$\eta \text{ relative} = \frac{\text{number of seconds for solution}}{\text{number of seconds for solvent}}$$

$$\eta \text{ specific} = \eta \text{ relative} - 1$$

$$\eta \frac{\text{specific}}{C} = \frac{\eta \text{ specific}}{\text{grams polymer per 100 ml. solvent}}$$

$$[\eta] \text{ (intrinsic)} = \frac{\eta \text{ specific}}{C} \text{ as } C \to 0$$

The term "prepolymer," which term is intended to cover both homopolymers or copolymers and which preferably but not essentially is free of silicon-bonded hydroxyl groups can be made by any one of several methods. Thus, in the preparation of, for instance, the prepolymer from an aryltrihydrolyzable silane, for instance, phenyltrichlorosilane, one method comprises hydrolyzing the latter with water in an amount sufficient to effect complete hydrolysis of the silicon-bonded hydrolyzable groups, advantageously employing a solvent such as benzene, toluene, xylene, diethyl ether, etc., as a diluent for the hydrolysis medium. The acid layer is removed and the resin layer (washed free of acid), which is advantageously in the form of an aromatic hydrocarbon solution, is treated, for instance, by azeotropic distillation, to remove any of the residual water and HCl.

When preparing precopolymers (used to make final organopolysiloxane compositions herein described) composed of at least 90 mol percent of monophenylsiloxy units with either diphenylsiloxy units or siloxy units containing from 1 to 2 organic groups selected from the class consisting of alkyl, alkenyl, and cyanoalkyl radicals within the range of 10 mol percent or less, there are several means for accomplishing this. One method comprises cohydrolyzing an aryltrihydrolyzable silane with the requisite molar amount of either a diaryldihydrolyzable silane or a hydrolyzable silane of the formula

$$Z_m SiY_{4-m}$$

where Z is a lower alkyl radical, alkenyl radical, or cyanoalkyl radical of from 2 to 4 carbon atoms (exclusive of the —CN radical), and Y is a hydrolyzable group, for example, halogen (e.g., chlorine, bromine, etc.), an organoxy radical (e.g., ethoxy, aryloxy, etc., radical), acyloxy, etc., and $m$ is an integer of from 1 to 2, inclusive.

When making copolymers for the prepolymer stage by the cohydrolysis of the aryltrihydrolyzable silane with the one or more cohydrolyzable silanes conforming to the above-described organic types and number of substituents on the silicon, the conditions for hydrolysis are generally well known in the art and of course include the use of an amount of water sufficient to effect complete hydrolysis of all silicon-bonded hydrolyzable groups. The use of inert solvents in carrying out this hydrolysis, for instance, benzene, toluene, xylene, etc., is shown in such United States patents as, e.g., 2,504,839—Hyde; 2,456,627—Doyle; 2,470,497—Lamoreaux; and 2,383,827—Sprung.

Instead of effecting cohydrolysis of the aryltrihydrolyzable silane in combination with the other hydrolyzable silanes, one can effect interpolymerization between the aryl prepolymer obtained from the aryltrihydrolyzable silane with organopolysiloxanes already having the other desired organic groups, i.e., diaryl siloxanes, siloxanes containing from 1 to 2 lower alkyl or cyanoalkyl radicals on each silicon atom, etc. For instance, the prepolymer from the phenyltrihydrolyzable silane can be interacted under heat with octamethylcyclotetrasiloxane, octaphenylcyclotetrasiloxane, tetramethyltetraphenylcyclotetrasiloxane, or with tetramethyltetracyanoalkylcyclotetrasiloxane, for instance, tetramethyltetra(beta-cyanoethyl)cyclotetrasiloxane, in the presence of a suitable solvent, such as toluene, employing an alkaline rearrangement catalyst, for effecting interpolymerization. The heating is advantageously carried out to a point where the reaction product is substantially free of silicon-bonded hydroxyl groups. This stage is desirable not only when making the procopolymers but also when making the prepolymers with the aryl trihydrolyzable silanes, for instance, the prepolymer derived from the hydrolyzate of phenyltrichlorosilane.

As specific examples of monomeric silanes which can be hydrolyzed and cohydrolyzed and polymeric siloxanes which can be copolymerized in order to make the prepolymers which are subsequently treated at elevated temperatures in the presence of the rearrangement catalyst in the requisite solvent at the concentration required to obtain polymers with intrinsic viscosities within the scope of our invention, one can mention as the monomeric silanes, for instance, the hydrolyzates of phenyltrichlorosilane; biphenyltrichlorosilane; naphthyltriethoxysilane; tolyltriacetoxysilane; anthracyl trichlorosilane, etc.

Among the cohydrolyzates which may be prepared in accordance with the above general instructions may be mentioned, for instance, the cohydrolysis of phenyltrichlorosilane and diphenyldichlorosilane; the cohydrolysis of phenyltrichlorosilane and methyltrichlorosilane; the cohydrolysis of phenyltrichlorosilane and beta-cyanoethyltrichlorosilane; the cohydrolysis of phenyltrichlorosilane and dimethyldichlorosilane; the cohydrolysis of phenyltrichlorosilane and methyl beta-cyanoethyldichlorosilane; the cohydrolysis of biphenyltriethoxysilane and diphenyldiethoxysilane; the cohydrolysis of naphthyltrichlorosilane and dimethyldichlorosilane; cohydrolysis of phenyltriethoxysilane and isopropyltriethoxysilane; cohydrolysis of phenyltriethoxy silane and methyl vinyldiethoxysilane; etc. The use of ternary cohydrolysis reactants is not precluded, as, for instance, a ternary mixture of phenyltrichlorosilane, methyltrichlorosilane, and beta-cyanoethyl methyldichlorosilane; phenyltrichlorosilane, dimethyldichlorosilane and methyl phenyldichlorosilane, etc. It should, of course, be understood that when effecting cohydrolysis of two or more cohydrolyzable ingredients including the monoaryltrihydrolyzable silane, the hydrolyzable silanes other than the latter monoaryltrihydrolyzable silane should be present in molar concentrations of 10 mol percent or less of the total molar concentration of all the hydrolyzable silanes.

Included among the organopolysiloxanes which can be used in making copolymerized prepolymers can be mentioned, for instance, the monoarylpolysiloxanes in combination with one or more of the following, for instance, octaphenylcyclotetrasiloxane, octamethylcyclotetrasiloxane, tetramethyltetraphenylcyclotetrasiloxane, octaethylcyclotetrasiloxane, decamethylcyclopentasiloxane, the hydrolyzate of methyltrichlorosilane, tetramethyl tetra-(beta - cyanoethyl)cyclotetrasiloxane, tetramethyltetravinylcyclotetrasiloxane, etc. It will again be understood that in effecting copolymerization of the siloxanes, there will be employed for coreaction with the hydrolyzate of the aryltrihydrolyzable silane, molar quantities of the other organosiloxane or siloxanes which do not exceed 10 mol percent of the total molar concentration of the ingredients.

For interpolymerization of the organopolysiloxanes described immediately above, one can employ from about 0.001 to about 0.1%, by weight, based on the weight of the organopolysiloxane undergoing treatment, of an alkaline rearrangement and condensation catalyst, for instance, potassium hydroxide, cesium hydroxide, tetramethyl ammonium hydroxide, tetrabutyl phosphonium hydroxide, etc. The temperature at which the interaction for making the prepolymer is carried out may vary from about 75 to 175° C., for times of the order of from about 10 minutes to about 20 hours or more. Generally, the heating is continued until the prepolymer is substantially free of silicon-bonded hydroxyl groups. Solvents are advantageously employed in this copolymerization reaction. It should be noted that if the molar concentrations or organosiloxy units, other than the monoarylsiloxy unit, approach or exceed 10 mol percent, in the final polymer prepared in accordance with our invention, the intrinsic viscosity will generaly fall below 0.4.

The preparation of the organopolysiloxane compositions having intrinsic viscosity of at least 0.4 or higher is accomplished by first mixing the prepolymer more particularly described above with a suitable solvent, or mixture of suitable solvents, in such an amount that the percentage of solvent is equal to more than 30 percent, by weight, of the total weight of the prepolymer and the solvent. Thus, we may employ on a weight basis from about 0.75 to 10 parts of the solvent (or mixture of solvents) per part of the prepolymer. It is generally desirable though not essential to add the alkaline rearrangement and condensation catalyst at this point for solubility reasons. Additional solubility of the alkaline catalyst can be obtained by making alcohol derivatives thereof such as the methanol derivative of the alkaline rearrangement catalyst, for instance, the methanol derivative of potassium hydroxide. Alternatively, the prepolymer may already have the catalyst present as a result of the same catalyst being used to make the prepolymer, in which case the residual catalyst is sufficient to prepare the final organopolysiloxane of increased molecular weight.

Thereafter, the mixture of the prepolymer and the solvent is heated at a temperature sufficiently high to remove from contact with the prepolymer a sufficient amount of solvent, so that the remaining solvent in contact with the prepolymer is less than 30 percent, by weight, of the total weight of the prepolymer and the remaining solvent. The essence of our invention resides in calculating from Formula I the concentration of solvent and prepolymer in the reaction mixture to be such so as to yield the desired intrinsic viscosity.

The monitoring of the amount of solvent remaining for polymerization purposes with the prepolymer can be accomplished by ascertaining the amount of excess solvent which has been removed at elevated temperatures (e.g., at temperatures of from about 75° to 250° C. or higher depending on the solvent originally present in the prepolymer), or determining the weight of prepolymer and solvent in the reaction mixture and removing that amount of solvent required to bring the relationship of the solvent and the prepolymer within the parameters of the above-identified Formula I. For attainment of intrinsic viscosities well above 0.4 and within the range of between 1.5 to 5, it is important that the weight percent of the solvent based on the total weight percent of the latter and the prepolymer be materially less than 30 weight percent and generally be less than 15 weight percent. To insure obtaining the desired molecular weight distribution and narrow intrinsic viscosity range, once having determined the intrinsic viscosity desired and having translated this desired intrinsic viscosity into a wegiht ratio of solvent and prepolymer, precaution should be taken to insure that there is no substantial change in the solvent-prepolymer weight relationship. This can be accomplished by confining the mixture of the solvent and prepolymer after the excess solvent has been removed in a vessel designed to retain the polymer-solvent relationship by preventing volatilization of the solvent during conversion of the prepolymer.

Among the solvents which may be employed in the practice of our invention, and which preferably should be substantially inert to the rearrangement catalyst and should not deplete the catalyst concentration, or interact with the prepolymer or with the final organopolysiloxane, may be mentioned, for instance, diphenyl, diphenyl oxide, mixtures of the latter two ingredients (e.g., Dowtherm A sold by Dow Chemical Company, Midland, Michigan), methyl phenyl ether, ethyl phenyl ether, cyclohexane, benzonitrile, mesitylene, durene, benzene, toluene, xylene, meta-dimethoxybenzene, pyridine, pyrrole, 4-picoline, 2,6-lutidine, nitrobenzene, fluorobenzene, dibenzofuran, etc., as well as mixtures of these solvents.

In addition to the above solvents which can be used as the sole medium in which the polymerization of the prepolymer to the final organopolysiloxane takes place, one can also add mixtures of the above or other auxiliary solvents for the purpose of improving the distribution and homogeneity of the prepolymer in the solvent in which the polymerization will ultimately take place so that there will be more intimate contact between the prepolymer and the final solvent in which the final polymerization will take place. Thus, one can add benzene, toluene, or xylene, or some other auxiliary low boiling solvent (e.g., boiling below about 110° C.) to any of the higher boiling solvents mentioned previously to enhance the solubility of the prepolymer in the latter solvent, and having accomplished this improved solvation, the added lower boiling solvent can be removed by suitable means, such as by volatilization. The remaining solvent concentration (of either the high or low boiling components, or both) can be such as is dictated by the attainment of the desired intrinsic viscosity pursuant to Formula I.

The proportion of these auxiliary solvents can vary considerably provided that care is exercised to insure that after these auxiliary solvents are removed, the residual solvent in which the final polymerization will take place is present in a concentration sufficient to give the desired intrinsic viscosity within the scope of the formula recited above. The proportion of the auxiliary solvents to the polymerizing solvent can be varied widely and may range on a weight basis from about 1.05 to as high as 10 parts or more of the auxiliary solvent (or solvents) per part of the polymerizing solvent (or solvents).

Once the auxiliary solvent or the polymerizing solvent is removed or reduced to the desired concentration level dictated by the desired intrinsic viscosity, the prepolymer and the polymerizing solvent are heated to convert the former to the higher intrinsic viscosity state (hereinafter called the "polymer"). The temperature at which the heating will take place can vary widely, and generally is of the order of from about 175–325° C., depending on the solvent used, the type of prepolymer, etc. As long as one has the proper solvent concentration, the polymerization to the polymer state can ordinarily be carried out at somewhat lower temperatures than was believed obtainable in accordance with the process described in the above-mentioned Vogt et al.. Patent U.S. 3,017,386, the precaution being that the solvent concentration should be maintained at a fairly constant level in order to avoid either premature gelation of the prepolymer or else conversion to a product which has an undesirably large spread of molecular weight or of intrinsic viscosity.

The rearrangement and condensation catalyst used includes some of those employed in making the prepolymer i.e., alkali-metal hydroxides, alkali-metal silanolates, for instance, the potassium salt of methylsilanetriol, the potassium salt to phenylsilanetriol, etc., either alone or in the form of an alcohol, for instance, methanol solution. The amount of alkaline rearrangement catalyst used in converting the prepolymer to the higher intrinsic viscosity composition may be varied widely but advantageously is within the range of from about 0.002 to about 0.5 percent or more, by weight, based on the weight of the prepolymer undergoing treatment.

The time of heating (which may be at normal or super-atmospheric pressures) may be varied widely and will depend upon such factors as, for example, the prepolymer undergoing reaction, the catalyst used, the catalyst concentration, the particular solvent, solvent concentration, etc. Generally times on the order of about 30 minutes to 8 hours or more are sufficient to obtain the desired intrinsic viscosity. More careful control should be exercised in the case of the prepolymer containing silanol groups than in the case where the prepolymer is free of silanol groups in order to avoid gelation. However, by maintaining the concentration of solvent constant in accordance with the formula recited above, the danger of gelation is materially eliminated.

Althouh it is not intended to be restricted to any theoretical considerations, it is believed that the polymers obtained in accordance with the practice of our invention, are generally of a linear nature which would account for the soluble characteristics. Flow birefringence and light scattering data indicate that the molecule is a large randomly coiled linear molecule. Infrared data point to the presence of linear polysiloxane chains and unstrained cyclotetrasiloxane rings. From this data it is believed that the polymers may be composed of a large number of linearly arranged siloxy units of the formula

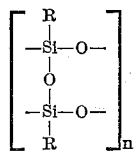

where R is an aryl radical, many examples of which have been given above and n is a whole number greater than 50, and may be as high as several hundred to several thousand or more.

In order that those skilled in the art may better understand how the present invention may be practiced, the following examples are given by way of illustration and not by way of limitation. All parts are by weight.

The prepolymer employed in the following examples was prepared as follows. About 500 parts phenyltrichlorosilane dissolved in 500 parts toluene were added slowly with stirring to 2000 parts water. The acid layer was separated and the resin layer in a form of a toluene solution was subjected to azeotropic distillation to remove residual water and HCl. Thereafter, about 0.08 percent, by weight, KOH based on the weight of the calculated hydroxyl free phenylpolysiloxane was added, and the toluene solution was refluxed with stirring for about 9 hours to give a silanol-free phenyl prepolymer. The resulting syrupy, phenylpolysiloxane prepolymer comprising about 50.3 percent, by weight, of the toluene solution was composed of the recurring units of the formula $$C_6H_5SiO_{1.5}$$

Separation of the solid phenyl prepolymer was accomplished by diluting the above toluene solution of the phenylpolysiloxane prepolymer with about 1.5 times the weight thereof of mineral spirits (Stoddard solvent boiling approximately within the range of 156°–196° C., approximate K.B. value of 37). The resultant slurry was agitated strongly for about 10 minutes and then vacuum filtered, giving a solid prepolymer product which was air dried for about 16 hours and then for 4 hours at 150° C.

EXAMPLE 1

A solution of the above-identified prepolymer containing about 0.05 percent by weight thereof residual KOH remaining in the prepolymer as a result of the preparation of the latter, was prepared by mixing together 50 parts of the prepolymer, 11.9 parts of o-nitrophenetole in about 220 parts benzene. The solution was then heated in an open vessel at a temperature sufficiently high (about 100–125° C.) to flash off and remove essentially all of the benzene. Thereafter, observing the requirements of Formula I and desiring to obtain an intrinsic viscosity of approximately 2.75 dl./g., an amount of the mixture of the solvents was removed by heating at approximately 250° C. until there remained in contact with the phenyl prepolymer, about 2.6 parts solvent (which was mostly o-nitrophenetole). The remaining mixture was then heated for about 2 hours at 250° C. in the same vessel, but this heating was conducted in such a manner that the vessel was closed to prevent further escape of the solvent. At the end of this time, the solid polymeric composition thus obtained was dissolved in about 700 parts benzene, and the solution was acidified with an amount of glacial acetic acid sufficient to neutralize the remaining potassium hydroxide in the reaction mixture. This solution was then precipitated by adding about 3200 parts methanol for this purpose. The precipitated polymer was removed, filtered and vacuum-dried to give a benzene-soluble polymer having an intrinsic viscosity of 2.85 dl./g. in benzene at 25° C.

EXAMPLE 2

In this example, 50 parts of the above-mentioned prepolymer containing again 0.05 percent, by weight, thereof of KOH was mixed with 10 parts dibenzofuran (as main solvent) and 220 parts benzene as auxiliary solvent in the same manner as was done in Example 1. The solution was then heated in an open vessel at a temperature sufficiently high to remove most of the benzene (about 100–125° C.). Since it was desired to make a polyphenylsiloxane having an intrinsic viscosity of about 3.5 dl./g., pursuant to Formula I, the solution was heated at a temperature of about 250°–275° C. until about 2.2 parts solvent remained in contact with the prepolymer. Thereafter, the reaction vessel was covered in a manner designed to prevent further loss of solvent (primarily dibenzofuran) and the remaining solution of the phenyl prepolymer was heated at a temperature of about 250° C. for approximately 2 hours. At the end of this time, the polymer was dissolved in benzene, acidified with glacial acetic acid, and precipitated with methanol similarly as was done in Example 1. Isolation of the phenylpolysiloxane thus obtained and drying of the composition under vacuum yielded a polymer having an intrinsic viscosity of approximately 3.63 dl./g. when measured in benzene at 25° C.

EXAMPLE 3

In this example, desiring an intrinsic viscosity of 4.0, a mixture of ingredients was prepared from 50 parts of the above-identified phenyl prepolymer, 0.05 percent, by weight, KOH and 50 parts diphenyl. The mixture was heated in an open vessel to a temperature of about 250° C. and while at this temperature the diphenyl solvent was allowed to volatilize until there remained about 2 parts slovent in contact with the prepolymer commensurate with that required to give a polymer having the desired intrinsic viscosity. The reaction vessel was then covered in such a manner so as to prevent further significant change in the concentration of the diphenyl and the mixture of ingredients was heated for about 2 hours at a temperature between 250° to 310° C. Thereafter, the polymer was disolved in about 500 parts benzene, acidified with enough glacial acetic acid to neutralize the KOH and precipitated in about an equal weight of methanol similarly as was done in the preceding examples to give a finely divided polymer which, when isolated and vacuum-dried, was found to have an intrinsic viscosity of 4.25 deciliters per gram when measured at 25° C. in benzene.

We have also found that higher intrinsic viscosity materials having a narrow range of molecular weight distribution and intrinsic viscosity can be obtained from the prepolymers heretofore described using low boiling solvents particularly aromatic hydrocarbon solvents such as, benzene, toluene, xylene, etc., which are solvents for the prepolymer and yet are inert in the presence of the prepolymer and the alkaline rearrangement and condensation catalyst. We have further found that these low boiling solvents require superatmospheric pressures and the sole consideration for obtaining our products is that the concentration of the low boiling solvent in the polymer at the time of polymerization is less than 30 weight percent of the total weight of the solvent and the prepolymer. These findings are supported by the following examples.

EXAMPLE 4

In each of the following tests, a specified amount of benzene and the phenyl prepolymer described above was mixed together to form a solution and charged to a pressure reactor of about 124 cc. volume. The amount of prepolymer used was determined in accordance with Formula I commensurate with the desired intrinsic viscosity. The amount of benzene used was in excess of that required by the formula. The excess used was that calculated as being capable of existing in the gas phase (out of contact with the prepolymer) with the balance of the solvent remaining in the condensed phase in contact with the prepolymer and the small amount (0.05%) of KOH in an amount calculated by Formula I to give the desired intrinsic viscosity. The pressure reactor was sufficiently large to accommodate both gas phase and liquid phases. The pressure reactor was closed and the contents heated at an elevated temperature and pressure for about 2 hours. Thereafter, the pressure vessel was cooled and the contents were dissolved in about 10 times its volume of benzene, acidified with sufficient acetic acid to neutralize the KOH. The polymer was precipitated in methanol similarly as was done in the preceding examples. In each instance there was obtained a polymer of an intrinsic viscosity and molecular weight in excess of that of the phenyl prepolymer, but corresponding quite closely to the desired calculated intrinsic viscosity. The following Table I shows the amount of phenyl prepolymer and benzene used in each test, the temperature of the reaction, the desired intrinsic viscosity calculated from Formula I (identified as "$[\eta]p$"), the actually obtained intrinsic viscosity (identified as "$[\eta]ob$"), and the weight of benzene in the liquid phase in contact with the prepolymer during polymerization:

Table I

| Test No. | Grams Benzene | Grams Prepolymer | Temp. of Reaction, °C. | $[\eta]p$ | $[\eta]ob$ | Calculated Grams Benzene in Condensed Phase [a] |
|---|---|---|---|---|---|---|
| A | 8.8 | 50 | 271 | 1.0 | 1.3 | 5.5 |
| B | 4.4 | 50 | 264 | 3.0 | 2.5 | 2.5 |
| C | 1.8 | 10 | 273 | 1.8 | 1.5 | 0.7 |
| D [b] | 12.75 | 150 | 268 | 3.8 | 3.4 | 6.2 |

[a] In contact with prepolymer.
[b] Volume of reactor was 332 cc.—excess benzene vented to outside until above amount of benzene remained in condensed phase after which reactor was closed and reaction allowed to take place.

EXAMPLE 5

In this example a polymerization reaction was conducted under superatmospheric pressure similarly as was done in Example 4 with the exception that the size of the pressure reactor was about 330 cc. Furthermore, in this example in addition to using benzene as a solvent, diphenyl was also incorporated into the reaction mixture, the combined amount of benzene and diphenyl being well in excess of that required to give the desired intrinsic viscosity when calculated by means of Formula I. Additionally, instead of allowing all the solvent to remain within the confines of the reaction vessel, as the reaction vessel came up to reaction temperature, a predetermined amount of the solvent, which mainly comprised the benzene, was allowed to escape through a port or vent in the pressure reactor, after which the reactor was sealed and the polymerization reaction carried out similarly as was done in the above-mentioned Example 4. It should be recognized that in carrying out this reaction, essentially all of the diphenyl, because of its higher boiling point remained in contact with the prepolymer, and that a very small amount of benzene might have been dissolved in the prepolymer, but for the most part, any benzene which remained after the reaction vessel was sealed for the final polymerization step, was present in the gas phase above the surface of the solid reacting prepolymer. The actual conditions for carrying out the final polymerization reaction after venting of the solvent were essentially the same as in Example 3, i.e., the reaction with the above-described phenyl prepolymer was carried out for about 2 hours at the specified temperature, and thereafter the formed polymer was removed from the cooled reaction vessel, dissolved in benzene, the benzene solution acidified with a sufficient amount of acetic acid to neutralize the potassium hydroxide, and the polymer was precipitated with methanol in the same manner as is shown in the preceding examples. As a result of carrying out this process there were obtained polymers of an intrinsic viscosity and molecular weight in excess of that of the phenyl prepolymer but corresponding quite closely to the desired calculated intrinsic viscosity derived from Formula I. The following Table II shows the amounts of ingredients used, the temperatures of the reactions, the calculated intrinsic viscosity, the observed intrinsic viscosity, and the calculated weight of what is presumed to be biphenyl and any residual benzene in the condensed phase over and above the weight of (1) the calculated amount of solvent which was released from the pressure reactor prior to the final polymerization step, and (2) the benzene in the gas phase:

ing into account in each instance Formula I for determining in advance the amount of solvent in the condensed phase which will be necessary to give the desired intrinsic viscosity. This in turn will determine the amount of ex-

*Table II*

| Test No. | Grams Benzene | Grams Diphenyl | Grams Phenyl Prepolymer | Temp. of Reaction, °C. | $[\eta]$p | $[\eta]$ob | Calculated Total Grams Diphenyl and Benzene in Condensed Phase |
|---|---|---|---|---|---|---|---|
| E | 12.8 | 5 | 150 | 268 | 3.8 | 3.1 | 6.2 |
| F | 13.2 | 10 | 150 | 273 | 1.7 | 1.8 | 13.4 |

In all the foregoing examples, it was found that a much larger proportion of the components in the phenylpolysiloxane composition had an intrinsic viscosity of smaller variance from the obtained intrinsic viscosity than was the case when no control is exercised in the manner described above in the foregoing examples and thereby no use is made of Formula I. If the components in the phenylpolysiloxane composition have intrinsic viscosities which vary considerably from the average intrinsic viscosity obtained for the entire composition, or too many of these variant intrinsic viscosity materials are present, this leads to a reduction in mechanical and physical properties (such as an inability to form films) and also leads to losses occasioned by the necessity for removing these low intrinsic viscosity materials prior to further processing of the organopolysiloxane composition.

It will of course be apparent to those skilled in the art that in addition to the above-mentioned solvents and prepolymers, other solvents and prepolymers, many examples of which have been given above and in the aforesaid Brown and Vogt patent, may be used in the practice of the present invention.

Thus, one can make a prepolymer containing both silicon-bonded phenyl groups and silicon-methyl groups by cohydrolyzing phenyltrichlorosilane and methyltrichlorosilane in such proportions that the methyl phenylpolysiloxane copolymer contains about 98 mol percent monophenylsiloxy units of the formula $$C_6H_5SiO_{3/2}$$

and about 2 mol percent monomethylsiloxy units of the formula $$CH_3SiO_{3/2}$$

and thereafter heating the mixture of ingredients at elevated temperatures in a suitable solvent, especially diphenyl, in the presence of an alkaline catalyst in the same manner as is described in the preceding examples using initially an excess of the solvent and thereafter reducing the concentration of the solvent in accordance with Formula I and pursuant to the desired intrinsic viscosity. Instead of precopolymers containing monophenylsiloxy units and monomethylsiloxy units, one can also make precopolymers of monophenylsiloxy units and dimethylsiloxy units of the formula $$(CH_3)_2SiO$$

observing the required molecular concentrations of the monophenylsiloxy units that they be at least 90 mol percent of the total molar concentration of the two organosiloxy units, and thereafter heating the precopolymer in a suitable solvent generally as above in the presence of an alkaline rearrangement and condensation catalyst.

The concentration of the solvent may also be varied widely depending on the desired intrinsic viscosity takcess solvent which must be removed to give the desired polymer intrinsic viscosity. The conditions of reaction may also be varied widely as has previously been recited, and no limitation is intended by virtue of the conditions used in the preceding examples. The ingredients can also be varied particularly the alkaline rearrangement catalyst which again can be employed in varying concentrations.

The compositions prepared in accordance with the present invention have many uses. These compositions may be dissolved in solvents (in solids concentrations of from about 0.5 to 50 weight percent), for instance, benzene, and used to coat metallic conductors, to provide heat resistant insulation possessing good electrical properties. Solutions of these organopolysiloxanes can be cast on flat surfaces and the solvent evaporated to yield cohesive films which exhibit unusual heat resistance. These films can be used for many high-temperature applications, for example, as slot liners and as end turn winding insulation in motors.

Solutions of these compositions may also be applied to various textiles, particularly inorganic fibrous materials, to render the latter heat-resistant when the solvent is removed. Solutions of the organopolysiloxane compositions can be applied to adjacent surfaces, the treated surfaces pressed together, and heated to volatilize the solvent and to form a strong, heat resistant bond between the adhered surfaces.

Various fillers may be added to these compositions of intrinsic viscosity of 0.4 or higher, for instance, finely divided silicas (e.g., fume silica, silica aerogel, precipitated silica, etc.), carbon black, titanium dioxide, iron oxide, metallic pigments (for instance, finely divided aluminum powder), etc. Such pigments which may range in an amount equal to from about 0.5 to 50 percent, by weight, based on the total weight of the latter, and the polymeric compositions in which they are incorporated, are advantageously added to a solution of our polymeric compositions, and formed into, for instance, a dispersion which can be used for dipping or coating applications.

High temperature laminates may be prepared by dipping various organic and preferably inorganic porous materials such as glass wool, glass cloth, asbestos cloth, polyethylene terephthalate film, etc., in solutions of the above compositions, layers of the coated and/or impregnated materials superposed upon each other and pressed at elevated temperatures of the order of about 200 to 350° C. at pressures ranging, for instance, from about 5 to 5,000 p.s.i. Such laminates may be in the form of panels used for electrical insulation, insulating tapes, etc., and may also be formed and used as nose cones for rockets and other projectiles which are subjected to high temperatures at supersonic speeds.

What we claim as new and desire to secure by Letters Patent of the United States is:

1. The process for controlling the molecular weight and intrinsic viscosity distributions during the preparation of an organopolysiloxane composition from an organopolysiloxane prepolymer whose intrinsic viscosity is lower than the final product and which is composed of from 90 to 100 mol percent of organosiloxy units of the formula $$RSiO_{3/2}$$

any remaining organosiloxy units of the organopolysiloxane being selected from the class consisting of organosiloxy groups of the formula $$R'R''SiO, \; R'[CN-(CH_2)_m]SiO, \; R'''SiO_{3/2}$$

and $$CN(CH_2)_mSiO_{3/2}$$

where R is an aryl radical, R' and R'' are selected from the class consisting of aryl radicals, alkyl radicals, alkenyl radicals, and mixtures of such radicals, R''' is a lower alkyl radical, and m is a whole number equal to from 2 to 4, which process comprises (1) forming a solution of an organopolysiloxane prepolymer in at least one inert liquid which is a solvent for the prepolymer, the concentration of the aforesaid solvent being on a weight basis, within the range of from 0.75 to 10 parts of the solvent per part of the prepolymer, (2) heating the solution of the solvent and prepolymer at a temperature sufficiently high to remove sufficient solvent so that the remaining solvent is present in an amount equal to at most 30 weight percent, based on the total weight of the solvent and the prepolymer, and (3) thereafter continuing the heating of the remaining solvent and prepolymer in the presence of an alkaline rearrangement and condensation catalyst for organopolysiloxanes under such conditions that the concentration of remaining solvent and prepolymer is maintained substantially constant in accordance with the formula $\eta = 0.045(M/X)^{1.4}$, where $\eta$ is the desired intrinsic viscosity of the final organopolysiloxane in benzene, M is the weight of the prepolymer, and X is the weight of the solvent in the condensed phase in contact with the prepolymer, the said heating being continued until a higher molecular weight organopolysiloxane composition is obtained having an intrinsic viscosity in benzene at 25° C. of at least 0.4 deciliter per gram.

2. The process for controlling the molecular weight and intrinsic viscosity distributions during the preparation of a phenylpolysiloxane composition from a phenylpolysiloxane prepolymer whose intrinsic viscosity is lower than the final product and which is composed essentially of the recurring unit $C_6H_5SiO_{1.5}$, which process compreses (1) forming a solution of a phenylpolysiloxane prepolymer in at least one inert liquid which is a solvent for the prepolymer, the concentration of the aforesaid solvent being on a weight basis within the range of from 0.75 to 10 parts of the solvent per part of the prepolymer, (2) heating the solution of the solvent and the prepolymer at a temperature sufficiently high to remove sufficient solvent so that the remaining solvent is present in an amount equal to at most 30 weight percent, based on the total weight of the solvent and the prepolymer, and (3) thereafter continuing the heating of the remaining solvent and prepolymer in the presence of an alkaline rearrangement and condensation catalyst for organopolysiloxanes under such conditions that the concentration of remaining solvent and prepolymer is maintained substantially constant in accordance with the formula $$\eta = 0.045(M/X)^{1.4}$$

where $\eta$ is the desired intrinsic viscosity of the final organopolysiloxane in benzene, M is the weight of the prepolymer, and X is the weight of the solvent in the condensed phase in contact with the prepolymer, the said heating being continued until a higher molecular weight phenylpolysiloxane composition is obtained having an intrinsic viscosity in benzene at 25° C. of at least 0.4 deciliter per gram.

3. The process as in claim 2 in which the solvent is a mixture of o-nitrophenetole and benzene which together are present, on a weight basis, of from 0.75 to 10 parts thereof per part of the phenylpolysiloxane prepolymer.

4. The process as in claim 2 in which the solvent is a mixture of dibenzofuran and benzene, both of them being present on a weight basis of from 0.75 to 10 parts of the solvent mixture per part of the phenylpolysiloxane prepolymer.

5. The process as in claim 2 in which the solvent is diphenyl which is present on a weight basis of from 0.75 to 10 parts of the diphenyl per part of the phenylpolysiloxane prepolymer.

6. The process as in claim 2 in which the solvent is benzene which is present, on a weight basis, of from 0.75 to 10 parts of the benzene per part of the phenylpolysiloxane prepolymer.

7. The process as in claim 2 in which the solvent is composed of diphenyl and benzene, the combined weight of these solvents being equal, on a weight basis, of from 0.75 to 10 parts of the solvent mixture per part of the phenylpolysiloxane prepolymer.

References Cited by the Examiner

UNITED STATES PATENTS

| | | | |
|---|---|---|---|
| 2,832,794 | 4/1958 | Gordon | 260—46.5 |
| 3,000,858 | 9/1961 | Brown | 260—46.5 |
| 3,017,386 | 1/1962 | Brown et al. | 260—46.5 |

OTHER REFERENCES

Barry et al.: J.A.C.S., 77 (1955), 4249, lines 6–24.

LEON J. BERCOVITZ, *Primary Examiner.*

LOUISE P. QUAST, WILLIAM H. SHORT, MURRAY TILLMAN, *Examiners.*

M. I. MARQUIS, *Assistant Examiner.*